(12) United States Patent
Bolan et al.

(10) Patent No.: US 8,024,606 B2
(45) Date of Patent: Sep. 20, 2011

(54) POWER RESTORATION TO BLADE SERVERS

(75) Inventors: Joseph E. Bolan, Cary, NC (US); Vijay Kumar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/545,585

(22) Filed: Aug. 21, 2009

(65) Prior Publication Data

US 2011/0047390 A1     Feb. 24, 2011

(51) Int. Cl.
*G06F 11/00* (2006.01)
(52) U.S. Cl. .............. 714/22; 714/14; 713/300
(58) Field of Classification Search ............ 714/14, 714/22, 1, 2, 36; 713/300, 310, 320, 340, 713/1, 2
See application file for complete search history.

(56) References Cited

U.S. PATENT DOCUMENTS

| | | | |
|---|---|---|---|
| 6,950,952 B2 | 9/2005 | Felsman | |
| 7,093,141 B2 | 8/2006 | Elmozahy et al. | |
| 7,398,401 B2 | 7/2008 | Goud et al. | |
| 7,779,276 B2 * | 8/2010 | Bolan et al. | 713/300 |
| 2007/0180280 A1 * | 8/2007 | Bolan et al. | 713/300 |
| 2008/0172553 A1 | 7/2008 | Childress et al. | |
| 2009/0119523 A1 * | 5/2009 | Totten | 713/322 |

OTHER PUBLICATIONS

High Efficiency Power Management With Dynamic Phase Control; Apr. 13, 2009; IBM TBD; IP.com.
Method to Reprovision, Reallocate, and Rebalance IT Infrastructure Power to Multiple Servers in a Building Location; Nov. 12, 2004; IBM TBD; IP.com.

* cited by examiner

*Primary Examiner* — Philip Guyton
*Assistant Examiner* — Joseph Kudirka
(74) *Attorney, Agent, or Firm* — Edward J. Lenart; Cynthia G. Seal; Biggers & Ohanion, LLP

(57) ABSTRACT

Power restoration to blade servers including maintaining a list of blade server identifications and a value of power saving for each capped blade server; identifying losing power to the capped blade servers; restoring power to the previously capped blade servers in order of the values of power savings.

18 Claims, 3 Drawing Sheets

POWER RESTORATION TO BLADE SERVERS

BACKGROUND OF THE INVENTION

1. Field of the Invention

The field of the invention is data processing, or, more specifically, methods, apparatus, and products for power restoration to blade servers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in the administration of numbers of blade servers in blade environments. A typical blade environment may include a dozen or so blade servers or other types of computers in the blade form factor, while a data center taken as a whole may include hundreds or thousands of blade servers. As the number of blade servers in a blade environment increases their consumption of power can also increase. Because a given blade environment often has a certain amount of power capacity there can be a limit to the number of blade servers that can power on. In order to resolve this limitation blade servers must be prevented from exceeding a particular power consumption threshold. Such blades are said to be power capped. Upon loss and restore of power to the entire blade environment, power to each individual blade servers must be restored. It would be desirable to restore power to the blade servers and also ensure that the blade servers are power capped in the same manner as they were prior to losing power to the blade environment.

SUMMARY OF THE INVENTION

Power restoration to blade servers including maintaining a list of blade server identifications and a value of power saving for each capped blade server; identifying losing power to the capped blade servers; restoring power to the previously capped blade servers in order of the values of power savings.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
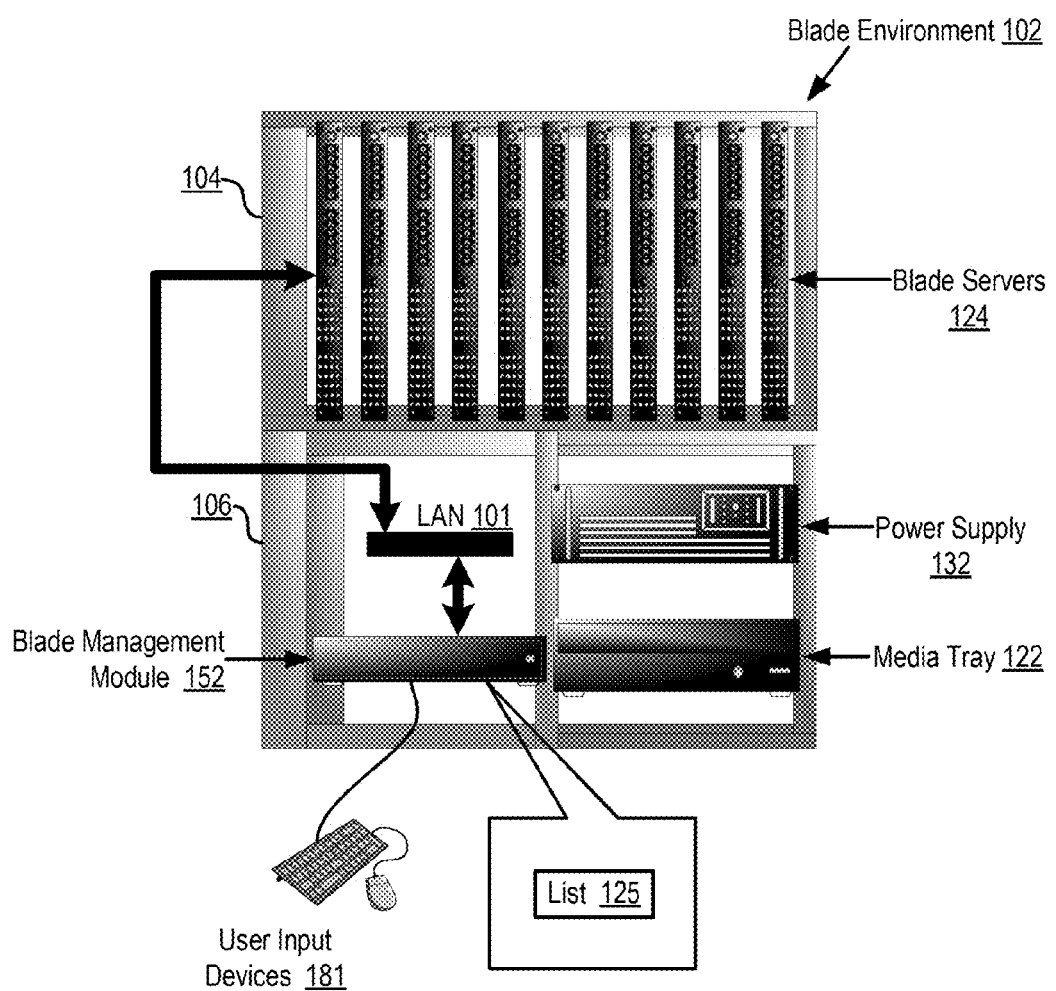
FIG. 1 sets forth a diagram of an example data processing system capable of power restoration to blade servers according to embodiments of the present invention.

Exemplary methods, apparatuses, and products for power restoration to blade servers in accordance with the present invention are described with reference to the accompanying drawings, beginning with FIG. 1. FIG. 1 sets forth a diagram of an example data processing system capable of power restoration to blade servers according to embodiments of the present invention. The data processing system of FIG. 1 includes a blade environment (102). 'Blade environment,' as the term is used in this specification, refers generally to a blade server system installed in this example in a two-bay chassis (104, 106) and including a number of blade servers (124), one or more blade management modules (152), a media tray (122), and a blade server system power supply (132).

The blade management module (152) is a small computer in its own right, including software and hardware components, one or more computer processors and computer memory, that provides system management functions for all components in the example blade environment (102) including the blade servers (124) and the media tray (122). The blade management module of FIG. 1 also also makes available connections for user input devices such as mice or keyboards (181) that are not generally connected directly to the blade servers or to the blade environment chassis. The blade servers themselves (124), installed in cabinet bay (104) of the exemplary blade environment (102) in the example of FIG. 1, are several computing devices implemented in blade form factor. The blade servers share access to the media tray (122). The blade servers (124) are connected to one another and to the blade management module (152) for data communications through a local area network ('LAN') (101). The LAN (101) is a small network installed within the chassis of the blade environment.

The media tray (122) houses non-volatile memory media generally. A media tray may typically include Compact Disc read-only media drives ('CD-ROM'), Digital Video Disc ROM drives (DVD-ROM), CD-RW drives, DVD-RW drives, floppy disk drives, and so on as will occur those of skill in the art.

Each of the blade servers (124) has a rating known as its nameplate power. The nameplate power is a value of power that would be drawn by the blade server if all of its capabilities were implemented and maximized. That is, for example, the name plate power is the power that would be drawn if every component and module that the blade server supports were installed and all those components were drawing the most power they could consume.

Often to manage power consumption of the blade environment (102) the blade management module (152) implements a power budget for the blade environment (102). Such a power budget establishes a maximum threshold of power consumption for the blade environment. A power budget for the blade environment (102) would often be exceeded if each individual blade server were allowed to draw its nameplate power.

To manage the total power drawn by the blade environment (102) and to comply with a power budget one or more of the blade servers (124) may be power capped. That is, one or more of the blade servers (124) are prevented from drawing more power than a cap value of power regardless of the nameplate power for the blade server. Such a blade server is said to be a capped blade server.

Upon loss and restoration of power to the blade environment, the blade management module (152) will automatically identify that power has been lost to the blade environment and restore power to each of the blades of the blade environment. Prior to loss of power to the blade environment the blade management module (152) is configured to restore the capping of the individual blade servers such that the capped blade servers are capped in the same manner as they were prior to losing power.

The blade management module (152) of FIG. 1 is capable of power restoration to blade servers (124) according to embodiments of the present invention. The blade management module (152) is capable of maintaining a list (125) of blade server identifications (190) and a value (192) of power saving for each capped blade server. Such a value of power savings may be the difference between a nameplate value for the blade server and a cap value. Alternatively, and often in cases where the nameplate powers of all of the blade servers are the same or similar, the value of power savings may be the cap value for the blade server. Upon identifying losing power to the capped blade servers, the blade management module (152) is capable of restoring power to the previously capped blade servers in order of the values of power savings. The blade management module (152) may restore power to the previously capped blade servers (124) in order of the values of power savings by selecting a next previously capped blade server without power having the highest value of power saving; restoring power to the selected previously blade server; capping the power of the selected next previously capped blade server; and allocating to a power budget for the blade server environment an amount of power saving from capping the power of the selected next previously capped blade server. Restoring power to the individual blade servers in this manner provides that the previously capped blade servers whose power is restored last may be restored to their previously capped values without exceeding a power budget for the blade environment.

The arrangement of the blade environment (102), network (101), and other devices making up the exemplary system illustrated in FIG. 1 are for explanation, not for limitation. Data processing systems useful according to various embodiments of the present invention for power restoration to blade servers may include additional servers, routers, and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 2:
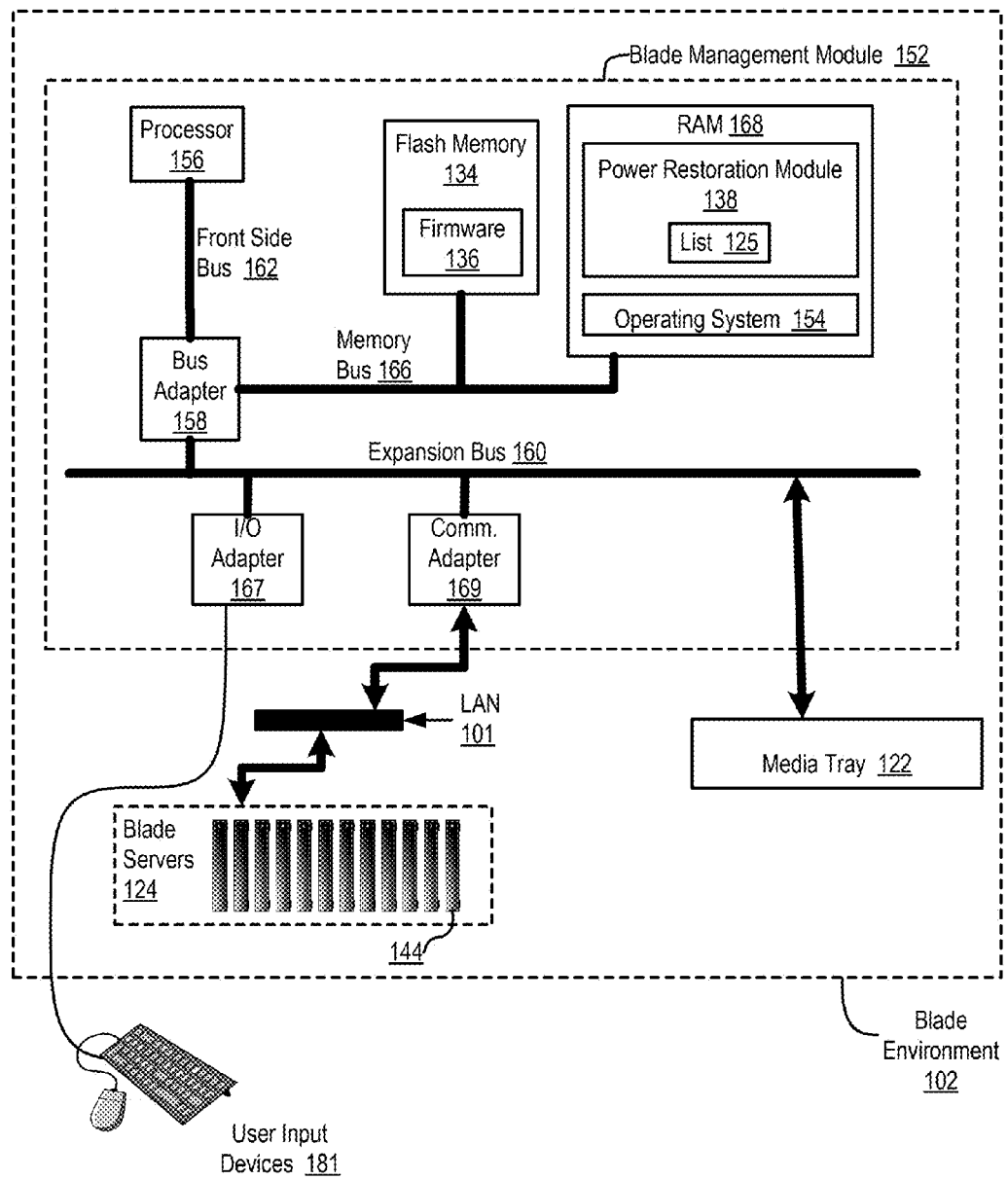
FIG. 2 sets forth a diagram of a further example data processing system capable of power restoration to blade servers according to embodiments of the present invention.

For further explanation, FIG. 2 sets forth a diagram of a further example data processing system capable of power restoration to blade servers according to embodiments of the present invention. The example data processing system of FIG. 2 is similar to the example of FIG. 1, including as it does a blade environment (102), blade servers (124) connected through an internal LAN (101) to a blade management module (152), a media tray (122) connected to the blade management module. In addition, however, by contrast with FIG. 1, FIG. 2 also includes a functional block diagram showing more detail of the blade management module (152). The blade management module (152) of FIG. 1 includes at least one computer processor (156) or 'CPU' as well as random access memory (168) ('RAM') which is connected through a high speed memory bus (166) and bus adapter (158) to processor (156) and to other components of the blade management module (152).

Stored in RAM in this example is a power restoration module (138), computer program instructions for power restoration to blade servers according to embodiments of the present invention. The power restoration module (138) includes computer program instructions for maintaining a list (125) of blade server identifications and a value of power saving for each capped blade server. Such a value of power savings may be the difference between a nameplate value for the blade server and a cap value. Alternatively, and often in cases where the nameplate powers for all of the blade servers are the same or similar the value of power savings may be the cap value for the blade server. The power restoration module (138) includes computer program instructions for restoring power to the previously capped blade servers in order of the values of power savings in response to identifying losing power to blade environment. The power restoration module (138) may restore power to the previously capped blade servers (124) in order of the values of power savings by selecting a next previously capped blade server without power having the highest value of power saving; restoring power to the selected previously blade server; capping the power of the selected next previously capped blade server; and allocating to a power budget for the blade server environment an amount of power saving from capping the power of the selected next previously capped blade server.

Also stored in RAM (168) is an operating system (154). Operating systems useful for power restoration to blade servers according to embodiments of the present invention include UNIX™, Linux™, Microsoft Windows XP™, Microsoft Vista™, AIX™, IBM's i5/OS™, and others as will occur to those of skill in the art. The operating system (154) and the power restoration module (138) in the example of FIG. 2 are shown in RAM (168), but many components of such software typically are stored in non-volatile memory also, such as, for example, on a disk drive or in firmware (136) on an EEPROM drive, here shown as flash memory (134).

The exemplary blade management module (152) of FIG. 2 includes one or more input/output ('I/O') adapters (167). I/O adapters implement user-oriented input/output through, for example, software drivers and computer hardware for controlling output to display devices such as computer display screens, as well as user input from user input devices (181) such as keyboards and mice.

The exemplary blade management module (152) of FIG. 2 also includes a communications adapter (169) that couples the blade management module (152) internally within the blade environment (102) for data communications with blade servers (124) through a local area network (101). The networks (101) may be implemented, for example, as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Such a communications adapter (169) are electronic modules that implement the hardware level of data communications through which one computer sends data communications to another computer through a data communications network. Examples of communications adapters useful according to embodiments of the present invention include modems for wired dial-up communications, Ethernet (IEEE 802.3) adapters for wired data communications network communications, and 802.11 adapters for wireless data communications network communications.

The arrangement of the blade management module (152), the blade servers (124), and other devices making up the exemplary system illustrated in FIG. 2 are for explanation, not for limitation. Data processing systems useful according to various embodiments of the present invention for power restoration to blade servers may include additional servers, routers, and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Figure 3:
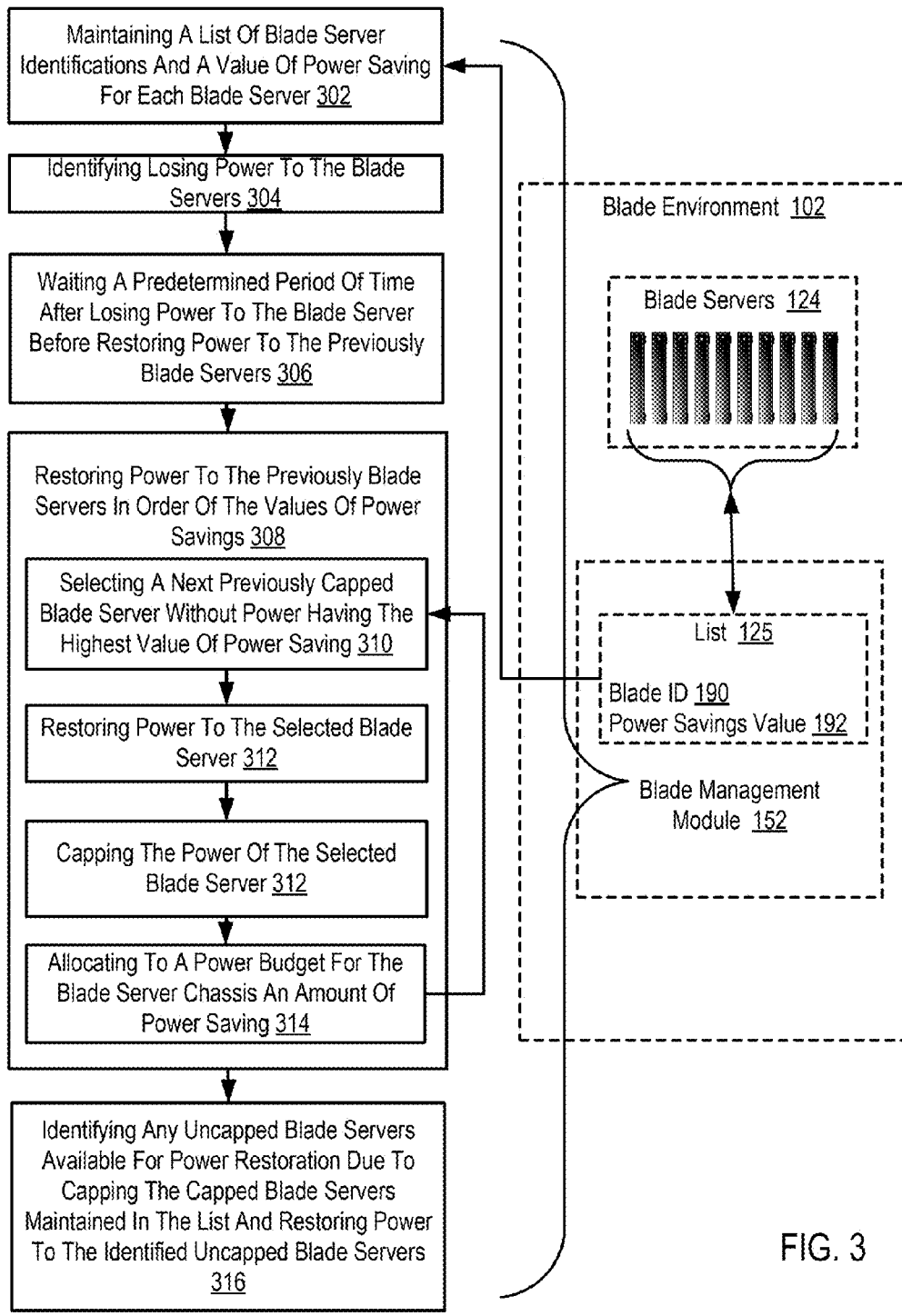
FIG. 3 sets forth a flow chart illustrating an exemplary method of power restoration to blade servers according to embodiments of the present invention.

For further explanation, FIG. 3 sets forth a flow chart illustrating an exemplary method of power restoration to blade servers according to embodiments of the present invention. The method of FIG. 3 includes maintaining (302), by a blade management module (152) in a blade environment (102), a list (125) of blade server identifications (190) and a value (192) of power saving for each capped blade server. A list (125) of blade server identifications (190) and a value (192) of power saving for each capped blade server may be implemented as a data structure including identifications of the individual capped blade servers and a value of power saving for each capped blade server. Such a value of power savings may be the difference between a nameplate value for the blade server and a cap value. Alternatively, and often in cases where the nameplate powers of all of the blade servers are the same or similar, the value of power savings may be the cap value for the blade server.

In an even further embodiment, the value of power saving for each capped blade server may be an identification of the nameplate power and cap value for each blade. In such an alternative embodiment, restoring power to the previously capped blade servers in order of the values of power savings includes calculating, after losing power upon restoration of power, from the nameplate power and cap value for each blade the difference between the nameplate power and cap value for each blade and restoring power in order of the calculated differences.

The method of FIG. 3 includes identifying losing (304) power to the capped blade servers and waiting (306), by the blade management module (152) in a blade environment (102), a predetermined period of time after losing power to the blade server before restoring power to the blade servers. In some cases a blade management module may lose communication with one or more blade servers that must be reestablished before restoring power to those blade servers. Waiting for a predetermined period of time allows for communications between the blade management module and all of the blade servers to be reestablished.

The method of FIG. 3 includes restoring (306), by the blade management module (152) in a blade environment (102), power to the previously capped blade servers in order of the values of power savings. In the method of FIG. 3, restoring (308) power to the previously capped blade servers (124) in order of the values of power savings is carried out by selecting (310) a next previously capped blade server without power having the highest value of power saving; restoring (312) power to the selected previously blade server; capping (313) the power of the selected next previously capped blade server; and allocating (314) to a power budget for the blade server chassis an amount of power saving from capping the power of the selected next previously capped blade server.

As mentioned above, values of power savings may be implemented in a number of ways. In embodiments of the present invention where the value of power savings is implemented as the difference between a nameplate value for the blade server and a cap value, selecting (310) a next previously capped blade server without power having the highest value of power saving may be carried out by selecting the next previously capped blade server without power having the largest difference between the nameplate value for the blade server and its cap value. In embodiments of the present invention where the value of power savings is implemented as the cap value for the blade server, selecting (310) a next previously capped blade server without power having the highest value of power saving may be carried out by selecting the next previously capped blade server without power having the lowest cap value. In an embodiments where the value of power saving for each capped blade server is implemented as an identification of the nameplate power and a cap value for each blade, selecting (310) a next previously capped blade server without power having the highest value of power saving may be carried out by calculating from the nameplate power and cap value for each blade the difference between the nameplate power and cap value for all blades and selecting the next previously capped blade server without power having the largest difference between the nameplate power and cap value.

In the method of FIG. 3, restoring (306), by the blade management module (152) in a blade environment (102), power to the previously capped blade servers in order of the values of power savings includes restoring (312) power to the selected previously capped blade server. Restoring (312) power to the selected previously capped blade server comprises establishing power to the selected previously capped blade server.

In the method of FIG. 3, restoring (306), by the blade management module (152) in a blade environment (102), power to the previously capped blade servers in order of the values of power savings includes capping (313) the power of the selected next previously capped blade server. Capping (313) the power of the selected next previously capped blade server may be carried out by establishing for the selected next previously capped blade server a threshold power consumption value for the selected blade server that is the same as the threshold power consumption value assigned to the blade server prior to losing power.

In the method of FIG. 3, restoring (306), by the blade management module (152) in a blade environment (102), power to the previously capped blade servers in order of the values of power savings includes allocating (314) to a power budget for the blade server environment an amount of power saving from capping the power of the selected next previously capped blade server. Allocating (314) to a power budget for the blade server environment an amount of power saving from capping the power of the selected next previously capped blade server may be carried out by adding the value of the difference between the nameplate value of the selected blade server and the cap value of the capped blade server to the power budget for the blade server environment. In many embodiments, the amount of power savings allocated to the power budget is the same as the value of power savings maintained in the list. In embodiments of the present invention that do not implement the value of power savings maintained in the list as the difference between nameplate value for a blade server and the cap value for the blade, the value of power savings maintained in the list and the amount of power savings allocated to the budget may be different values.

The method of FIG. 3 also includes identifying (316) any uncapped blade servers available for power restoration due to capping the capped blade servers maintained in the list and restoring power to the identified uncapped blade servers. After all of the previously capped blade servers have been restored to power with their previous power cap values, other uncapped blade servers, that is, blade servers that were not previously power capped, may be restored to power without exceeding the power budget of the blade server environment. Identifying (316) any uncapped blade servers available for power restoration due to capping the capped blade servers maintained in the list and restoring power to the identified uncapped blade servers may be carried out by selecting from a list of previously uncapped blade servers a next previously uncapped blade server.

Exemplary embodiments of the present invention are described largely in the context of a fully functional computer system for power restoration to blade servers. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of power restoration to blade servers, the method comprising:
    maintaining, by a blade management module in a blade environment, a list of blade server identifications and a value of power saving for each capped blade server;
    identifying losing power to the capped blade servers; and
    restoring, by the blade management module in a blade environment, power to the previously capped blade servers in order of the values of power savings.

2. The method of claim 1, wherein each value of power savings is the difference between a nameplate value for the blade server and a cap value.

3. The method of claim 1, wherein each value of power savings is a cap value.

4. The method of claim 1, wherein restoring, by the blade management module in a blade environment, power to the previously capped blade servers in order of the values of power savings further comprises:
    selecting a next previously capped blade server without power having the highest value of power saving;
    restoring power to the selected previously capped blade server;
    capping the power of the selected next previously capped blade server; and
    allocating, to a power budget for the blade server environment, an amount of power saving from capping the power of the selected next previously capped blade server.

5. The method of claim 1, further comprising:
    waiting, by the blade management module in a blade environment, a predetermined period of time after losing power to the blade server before restoring power to the blade servers.

6. The method of claim 1, further comprising:
    identifying, by the blade management module in a blade environment, any uncapped blade servers available for power restoration due to capping the capped blade servers maintained in the list; and
    restoring power to the identified uncapped blade servers.

7. An apparatus for power restoration to blade servers, the apparatus comprising a computer processor and a computer memory operatively coupled to the computer processor, the computer memory having disposed within it computer program instructions for:
    maintaining a list of blade server identifications and a value of power saving for each capped blade server;
    identifying losing power to the capped blade servers; and
    restoring power to the previously capped blade servers in order of the values of power savings.

8. The apparatus of claim 7, wherein each value of power savings is the difference between a nameplate value for the blade server and a cap value.

9. The apparatus of claim 7, wherein each value of power savings is a cap value.

10. The apparatus of claim 7, wherein computer program instructions for restoring power to the previously capped blade servers in order of the values of power savings further comprise computer program instructions for:
    selecting a next previously capped blade server without power having the highest value of power saving;
    restoring power to the selected previously capped blade server;
    capping the power of the selected next previously capped blade server; and
    allocating, to a power budget for the blade server environment, an amount of power saving from capping the power of the selected next previously capped blade server.

11. The apparatus of claim 7, wherein the computer memory also has disposed within it computer program instructions for:
    waiting a predetermined period of time after losing power to the blade server before restoring power to the blade servers.

12. The apparatus of claim 7, wherein the computer memory also has disposed within it computer program instructions for:

identifying any uncapped blade servers available for power restoration due to capping the capped blade servers maintained in the list; and restoring power to the identified uncapped blade servers.

13. A computer program product for power restoration to blade servers, the computer program product disposed in a computer-readable recordable medium, the computer program product comprising computer program instructions for:

maintaining a list of blade server identifications and a value of power saving for each capped blade server;

identifying losing power to the capped blade servers; and restoring power to the previously capped blade servers in order of the values of power savings.

14. The computer program product of claim 13, wherein each value of power savings is the difference between a nameplate value for the blade server and a cap value.

15. The computer program product of claim 13, wherein each value of power savings is a cap value.

16. The computer program product of claim 13, wherein computer program instructions for restoring power to the previously capped blade servers in order of the values of power savings further comprises computer program instructions for:

selecting a next previously capped blade server without power having the highest value of power saving;

restoring power to the selected previously capped blade server;

capping the power of the selected next previously capped blade server; and allocating, to a power budget for the blade server environment, an amount of power saving from capping the power of the selected next previously capped blade server.

17. The computer program product of claim 13, further comprising computer program instructions for:

waiting a predetermined period of time after losing power to the blade server before restoring power to the blade servers.

18. The computer program product of claim 13, further comprising computer program instructions for:

identifying any uncapped blade servers available for power restoration due to capping the capped blade servers maintained in the list; and restoring power to the identified uncapped blade servers.

* * * * *